United States Patent [19]
Peterson

[11] 3,744,340
[45] July 10, 1973

[54] STAMPED BRAKE PEDAL

[75] Inventor: Raymond R. Peterson, Pontiac, Mich.

[73] Assignee: General Motors Corporation, Detroit, Mich.

[22] Filed: Apr. 10, 1972

[21] Appl. No.: 242,654

[52] U.S. Cl. .................................................. 74/560
[51] Int. Cl. ............................................. G05g 1/14
[58] Field of Search .................. 74/560, 519, 512; 113/116 AA, 116 R

[56] References Cited
UNITED STATES PATENTS 2,077,279   4/1937   Snell ..................................... 74/560
3,052,130   9/1962   Kellogg et al. ................... 74/560 UX Primary Examiner—Charles J. Myhre
Assistant Examiner—F. D. Shoemaker
Attorney—W. E. Finken and D. D. McGraw et al.

[57] ABSTRACT

A one piece stamped brake pedal is provided having a tubular lever, an integrally stamped clevis at one end of the tubular lever providing a pivot by which the lever may be pivotally attached to the vehicle body, an integrally stamped pedal pad at the other end of the tubular lever, and a stamped pivot in the tubular lever intermediate the pedal pad and the clevis for attachment of the brake actuating push rod.

2 Claims, 9 Drawing Figures

Patented July 10, 1973 3,744,340
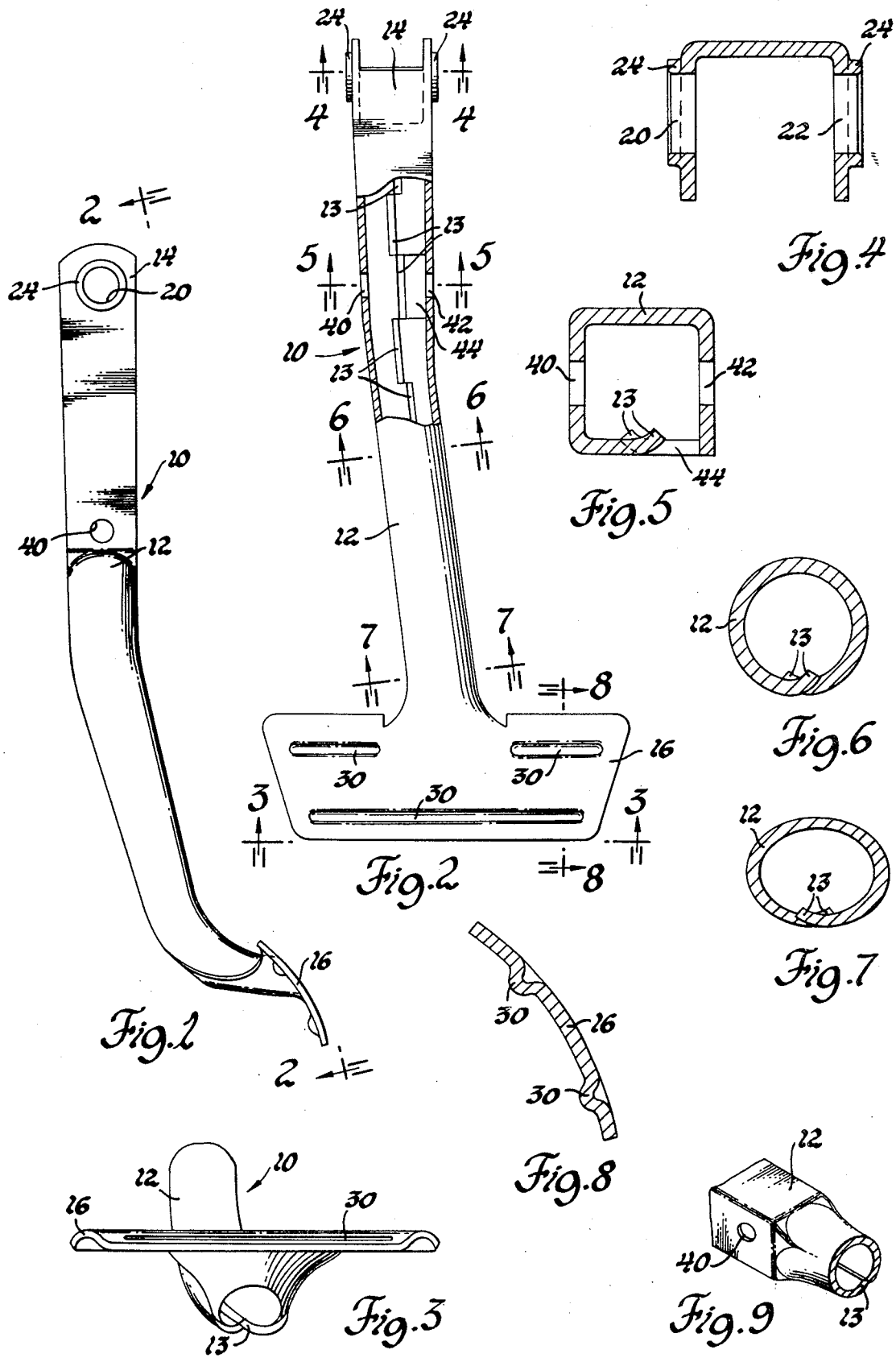

STAMPED BRAKE PEDAL

The invention relates to a brake pedal and more particularly to a one piece stamped tubular brake pedal having an integral pivot and pedal pad.

Conventional motor vehicles brake control systems have a brake pedal including a lever pivoted at one end to the vehicle body, a pedal plate at the other end of the lever to which the operator applies force, and a pivot intermediate the ends for attachment of a brake actuating push rod.

It is desirable from the standpoint of manufacturing economy as well as quality control that such brake pedals be of lightweight tubular construction and not require welding or equivalent joining operations.

It is known to provide a brake pedal having a stamped tubular lever portion with a pedal plate welded at one end thereof. It is also known to provide a brake pedal having a tubular lever portion with an apertured reinforcement plate attached at the end thereof to provide a pivot by which the lever may be pivotally attached to the vehicle body.

According to the present invention, a one piece stamped brake pedal is provided having a tubular lever, an integrally stamped pedal pad at the one end of the tubular lever, an integrally stamped clevis at the other end of the tubular lever, and a pivot in the tubular lever intermediate the pedal pad and the clevis for attachment of the brake actuating push rod.

One feature of the invention is a one-piece high strength brake pedal construction without any welds.

Another feature of the invention is the provision of a brake pedal manufactured by a stamping process.

Further objects, features, and advantages of the invention will become apparent upon consideration of the appended specification and the drawings in which:

FIG. 1 is a side elevation view of a brake pedal embodying the invention;

FIG. 2 is a frontal elevation view in the direction of arrows 2—2 of FIG. 1;

FIG. 3 is an end view of the brake pedal taken in the direction of arrows 3—3 of FIG. 2;

FIG. 4 is a sectional view of the brake pedal taken in the direction of arrows 4—4 of FIG. 2;

FIG. 5 is a sectional view taken in the direction of arrows 5—5 of FIG. 2;

FIG. 6 is a sectional view taken in the direction of arrows 6—6 of FIG. 2;

FIG. 7 is a sectional view taken in the direction of arrows 7—7 of FIG. 2;

FIG. 8 is a sectional view taken in the direction of arrows 8—8 of FIG. 2; and

FIG. 9 is a perspective view of the transition of the tubular lever from a rectangular to circular cross-section.

Referring to FIGS. 1 and 2, it will be seen that the brake pedal 10 of this invention includes a tubular lever portion 12 with an integrally formed clevis 14 at one end for pivotally mounting the brake pedal on a motor vehicle body and an integrally formed foot pad 16 at the other end upon which the vehicle operator places his foot to forcibly pivot the brake pedal 10.

The entire brake pedal 10 is stamped from a single sheetmetal blank. Referring to FIG. 2, the tubular lever portion 12 has interlocking tabs 13 along the length of its seam. The tabs 13 are provided by notching the generally parallel extending edges of the sheetmetal blank to provide alternate tabs and notches with the tabs on one edge being directly opposite the notches on the opposite edge. The blank is then formed into its tubular shape with the tabs 13 interlocking with a longitudinal interference fit to provide sufficient rigidity to prevent flexure of the brake pedal under the forces applied thereto during brake actuation.

Holes 20 and 22 are formed in one end of the blank in a stamping operation which provides bosses or flanges 24 about the holes. The holes 20 and 22 are so spaced as to be in opposite walls of the tubular lever 12 and aligned with one another to provide the clevis 14. The flanged walls of holes 20 and 22 provide an integral bearing surface for pivotal engagement of a rod extending through the holes 20 and 22 and an aligned hole in the vehicle body. As best seen in FIGS. 2 and 4 the cross section of the brake pedal assembly adjacent the clevis 14 is rectangular and those walls of the tubular lever between the walls containing holes 20 and 22 are cutout to a varying extent to permit the necessary degree of pivotal movement of the brake pedal 10 relative the vehicle body member on which it is mounted.

A generally planar foot plate 16 is integrally formed on the end of the tubular lever 12 opposite the clevis 14. The foot plate 16 includes stamped ribs 30 extending laterally of the longitudinal center line of the pedal to stiffen the foot plate against flexure by forces applied thereto by the vehicle operator. The cross section of the tubular lever 12 adjacent foot plate 16, as seen in FIG. 7, is elliptical to effect ease of transition between the tubular cross section and the generally planar foot plate 16.

Holes 40 and 42 are stamped in the sheetmetal blank intermediate the ends and are so placed as to be oppositely disposed in the walls of the tubular lever 12 and aligned with one another. The attachment of the pedal push rod to the tubular lever 12 is advantageously effected by providing an aperture 44 in the back side of the tubular lever. The pedal push rod, not shown, is inserted through the aperture 44 and a pin inserted through the aligned holes 40 and 42 and a mating aperture in the pedal push rod.

With reference to FIGS. 6, 7, and 9, it will be seen that a gradual transition is made in cross section of the tubular member from the elliptical cross section of section 7—7, to a circular cross section at section 6—6 and then to the rectangular cross section of section 4—4.

Thus, it will be seen that a high strength and lightweight one-piece stamped brake pedal having integral foot pad and clevis may be provided without welding or equivalent fastening operations heretofore required.

What is claimed is:

1. A stamped pedal for a motor vehicle comprising a tubular lever formed of a blank having tabs spaced along the generally parallel extending edges thereof, the blank being formed into tubular cross section with the tabs in interlocking engagement, integrally formed clevis means at one end of the tubular lever including a pair of stamped holes with integral load bearing flanges in opposed walls of the tubular lever, a generally planar foot pad stamped at the other end of the tubular lever and having stamped stiffening ribs therein, and stamped aperture means in the tubular lever intermediate the ends for pivotal attachment of a push rod.

2. A one-piece stamped vehicle brake pedal comprising an elongated tubular lever formed of a blank having the generally parallel extending edges thereof notched to provide alternate notches and tabs, the tabs on one edge located oppositely a corresponding notch on the other edge, the edges bent together with the tabs interlocking to provide the tubular lever, clevis means at one end of the tubular lever for pivotally attaching the pedal to a vehicle body and including a pair of stamped holes in opposed walls of the tubular lever having integral flanges to provide bearing surfaces, and integral foot pad means stamped at the other end of the tubular lever including a generally planar plate having stamped stiffening ribs therein extending laterally of the longitudinal axis of the tubular lever.

* * * * *